United States Patent [19]

Hakamada

[11] Patent Number: 4,725,888
[45] Date of Patent: Feb. 16, 1988

[54] PICTURE-IN-PICTURE TELEVISION RECEIVER

[75] Inventor: Kunio Hakamada, Tokyo, Japan

[73] Assignee: Sony Corporation, Tokyo, Japan

[21] Appl. No.: 420

[22] Filed: Jan. 5, 1987

[30] Foreign Application Priority Data

Jan. 8, 1986 [JP] Japan .................................. 61-001642

[51] Int. Cl.⁴ ...................... H04N 5/262; H04N 5/272
[52] U.S. Cl. ........................................ 358/183; 358/22
[58] Field of Search ........................... 358/183, 22, 181

[56] References Cited

U.S. PATENT DOCUMENTS 4,665,438 5/1987 Miron .................................. 358/183

FOREIGN PATENT DOCUMENTS 2822785 12/1978 Fed. Rep. of Germany ...... 358/183
34618 3/1979 Japan .................................... 358/183
180283 9/1985 Japan ...................................... 358/22

Primary Examiner—Tommy P. Chin
Attorney, Agent, or Firm—Philip M. Shaw, Jr.

[57] ABSTRACT

A picture-in-picture type television receiver in which a sub-picture screen is provided within a main picture screen and the pictures on the main and sub-picture screens can be exchanged by a viewer operated control. According to this television receiver, when a command for exchanging the pictures is issued, if the picture displayed on the main picture screen is of a PAY channel (CABLE CHANNEL), the main and sub-channels cannot be exchanged with each other, and the exchange of the pictures is inhibited. The viewer is warned of this exchange inhibition for a predetermined time period. Thus, the user can utilize the television receiver more conveniently and is relieved of any anxiety when the pictures are inhibited from being exchanged with each other.

6 Claims, 8 Drawing Figures

PICTURE-IN-PICTURE TELEVISION RECEIVER

BACKGROUND OF THE INVENTION

1. Field of the Invention

The present invention relates generally to television receivers and, more particularly, is directed to a television receiver of the so-called picture-in-picture type in which a sub-picture screen is displayed within a main picture screen in a picture-in-picture fashion.

2. Description of the Prior Art

In the prior art, there is known a television receiver of a so-called picture-in-picture type in which a sub-picture screen is displayed within a main picture screen in an inset fashion.

The picture-in-picture type television receiver is provided with a main tuner for forming, for example, a main picture video signal and a sub-tuner for forming a sub-picture video signal. In such a picture-in-picture type television receiver, the pictures displayed on the main and sub-picture screens can be exchanged with each other by exchanging the channel selection data of the main picture tuner and the sub-picture tuner (see Japanese published utility model application No. 60-17974).

In such a picture-in-picture type television receiver, it may be desired that a picture based on a high frequency input signal supplied from an auxiliary input terminal, for example a descrambler for receiving a pay television broadcast or the like, can be displayed in addition to the picture based on the video signal supplied through the television antenna. In this case, the antenna input and the high frequency input from the auxiliary input terminal must be switched. In order to omit a switching circuit, a circuit which employs a single switching circuit as shown in FIG. 1 has been proposed.

Referring to FIG. 1, an antenna input from an antenna AT and the high frequency input from an auxiliary input terminal 2 are supplied to a switching circuit 3. The output from this switching circuit 3 is supplied to a main tuner 5M and the antenna input from the antenna AT is supplied to a sub-tuner 5S. With the above circuit arrangement, when the high frequency input from the auxiliary input terminal 2 is supplied to the main tuner 5M by switching the switching circuit 3, the picture based on the high frequency input is displayed on the main picture screen Sm of the cathode ray tube 18.

With the circuit arrangement shown in FIG. 1, when the antenna input from the antenna AT is supplied to the main tuner 5M and the picture based on this antenna input is displayed on the main picture screen, the pictures displayed on the main screen Sm and the subpicture screen Ss can be exchanged with each other by exchanging the channel selection data of the main and sub-tuners 5M and 5S as described above. However, when the high frequency input from the auxiliary input terminal 2 is supplied to the main tuner 5M and the picture based on this high frequency input is displayed on the main picture screen, the pictures displayed on the main and sub-picture screens can not be exchanged with each other. This is because the sub-tuner 5S is not supplied with the high frequency input from the auxiliary input terminal 2. Accordingly, when the picture based on the high frequency input from the auxiliary input terminal 2 is displayed on the main picture screen and a command for exchanging the pictures displayed on the main and sub-picture screens is issued, an exchange of the channel selection data of the main and sub-tuners 5M and 5S should be inhibited. Further, when the channel selection data of the main and sub-tuners 5M and 5S are inhibited from being exchanged with each other, some warning should be given to the user so that the user will not become anxious when the pictures are not exchanged.

OBJECTS AND SUMMARY OF THE INVENTION

It is an object of this invention to provide an improved picture-in-picture type television receiver in which when the pictures displayed on the main and sub-picture screens can not be exchanged with each other, if a command for exchanging the pictures is issued, the exchange of pictures is inhibited and also the user is warned during a predetermined time period that the pictures are not being exchanged.

According to one aspect of the present invention, there is provided a television receiver of the type in which a sub-picture screen is provided within a main picture screen so that different pictures can be displayed on said main and sub-picture screens, wherein the improvement comprises:

(a) main tuner means, including a switching circuit, to which either a first high frequency input or a second high frequency input are selectively supplied through the switching circuit to thereby form a main picture video signal for said main picture screen, the main tuner means including a user operable main channel selector for selecting a channel from a plurality of channels embodied in the first high frequency input;

(b) sub-tuner means to which said first high frequency input is supplied to thereby form a sub-picture video signal for said sub-picture screen, the sub-tuner means including a user operable sub-channel selector for selecting a channel from a plurality of channels embodied in the first high frequency input;

(c) means for generating a command signal for exchanging pictures displayed on said main and sub-picture screens; and (d) means supplied with the command signal for exchanging the channel selection data of said main and sub-tuners with each other when said command signal is generated provided that said first high frequency input is then being supplied to said main tuner, but for inhibiting the exchange of the channel selection data of said main and sub-tuners and for generating a warning during a predetermined time period in order for a user to understand that the exchange is impossible if said second high frequency input is being supplied to said main tuner when the command signal is generated.

These and other objects, features and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

An embodiment of a television receiver according to the present invention will now be described with reference to the attached drawings.

Figure 2:
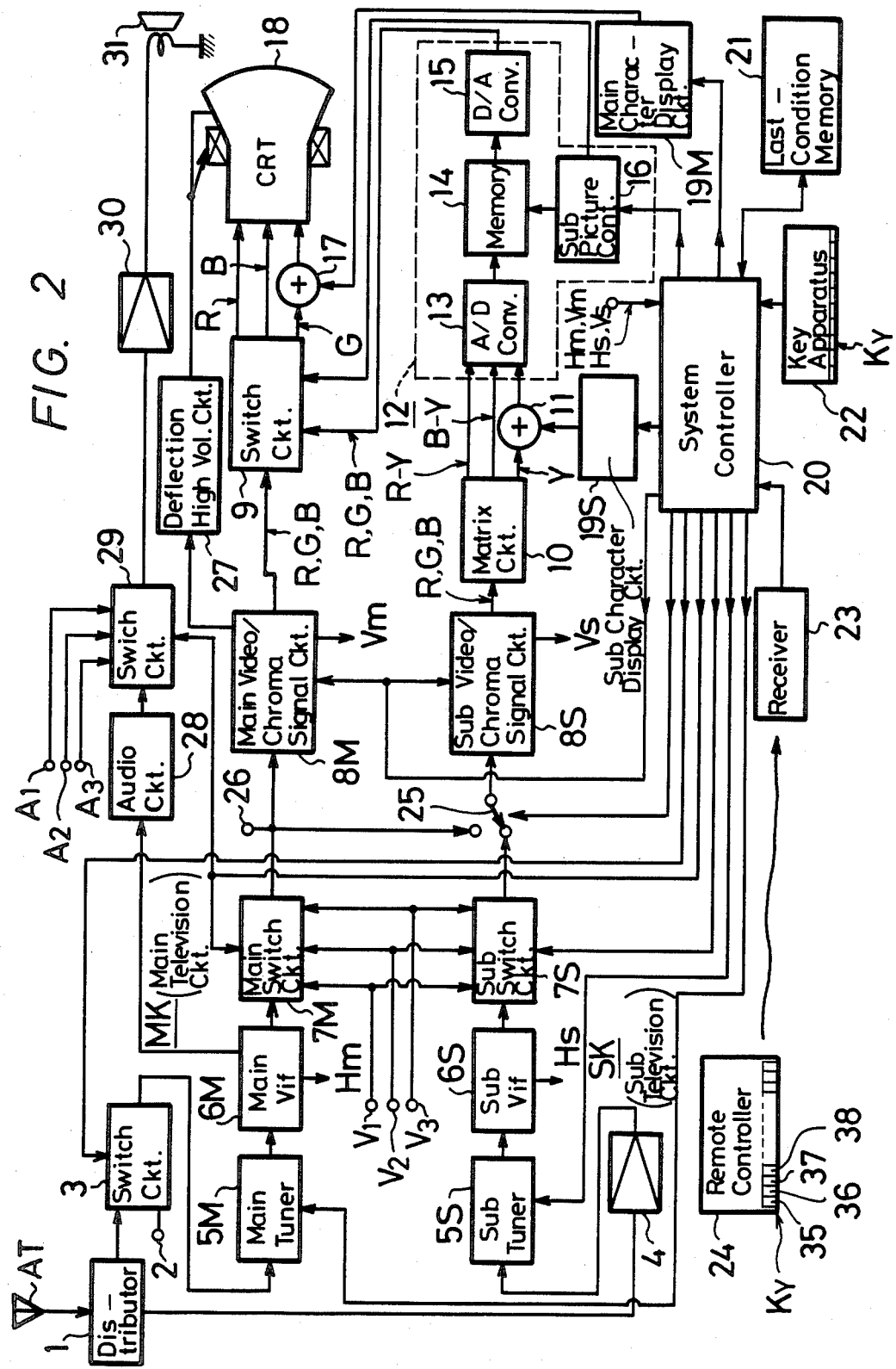
FIG. 2 is a block diagram showing an embodiment of a television receiver according to the present invention.

FIG. 2 is a block diagram showing an overall circuit arrangement of one embodiment of the television receiver according to the present invention.

Referring to FIG. 2, the television receiver of this invention includes a main television circuit MK and a sub-television circuit SK. From a video signal supplied by the main television circuit MK, a main picture is displayed on the whole picture screen of a cathode ray tube 18, whereas from a video signal supplied by the sub-television circuit SK, a sub-picture is displayed on one portion of the main picture screen in such a manner that the sub-picture is inset into the main picture. These main and sub-television circuits MK and SK include main and sub-tuners 5M, 5S, main and sub-video intermediate frequency circuits 6M, 6S and main and sub-video/chroma signal circuits 8M, 8S, respectively.

Further, the television receiver of the invention is provided with external video signal input terminals $V_1$, $V_2$ and $V_3$ to which displayed video signals (base band signals) from a VTR (video tape recorder) or the like are supplied. The video signals from these external input terminals $V_1$, $V_2$ and $V_3$ can be selectively switched in place of the video signals from the tuners 5M and 5S by the main and the sub-switching circuits 7M and 7S provided in the television circuits MK and SK. The signal selected by the switching circuit 7M is then supplied to the cathode ray tube 18 to be displayed on its picture screen.

The sub-television circuit SK also includes a video signal processor circuit 12 for displaying the sub-picture on the picture screen of the cathode ray tube 18. The video signal processor circuit 12 controls the kinds of sub-pictures, such as, a live picture, a still picture, a step-by-step picture or the like, the number of sub-pictures, the position of the sub-picture on the main picture screen, etc. By "live" picture is meant that the displayed image is animated rather than static.

The main and sub-television circuits MK and SK are respectively provided with main and sub-character display circuits 19M and 19S to display picture discriminating indications such as the reception channel of a television broadcast or the ordinary number of the external video signal input terminals, for example, on the respective main picture screen and the sub-picture screen in an inset fashion.

There is provided a controller 20 which includes a micro-computer. The respective sections of the television receiver are controlled by this system controller 20 as will be explained in greater detail hereinafter.

The circuit arrangement of the television receiver according to this invention will now be described more fully. A television broadcast signal received by an antenna AT is supplied to a distributor 1. The distributor 1 supplies the received signal through a switching circuit 3 to the main tuner 5M without substantially attenuating the same and also supplies a portion of the received signal to the sub-tuner 5S. The received signal to be applied to the sub-tuner 5S is first amplified by a high frequency amplifier 4. The switching circuit 3 selectively switches between the antenna input signal from the distributor 1 and a high frequency input signal from a descrambler used for receiving a cable television broadcast or the like from an auxiliary input terminal 2 and supplies one of them to the main tuner 5M.

The video signal from the main tuner 5M is supplied to the main video intermediate frequency circuit 6M. Then, the video intermediate frequency signal therefrom is supplied to the main switching circuit 7M which can be selectively switched between this video signal and the external video signals from the external video input terminals $V_1$ to $V_3$. The signal selected by the switching circuit 7M is supplied to the main video/chroma signal circuit 8M. A monitor output terminal 26 is connected to the output side of the main switching circuit 7M. This main video/chroma signal circuit 8M generates red, green and blue color signals R, G and B which are then fed to a switching circuit 9.

The audio intermediate frequency signal from the main video intermediate frequency circuit 6M is supplied to an audio circuit (incorporating therein a sound multiplexing decoder circuit) 28. The audio signal from the audio circuit 28 is supplied to a switching circuit 29 which can be selectively switched between this audio signal and the external audio signals displayed from the VTR and the like and supplied thereto from external audio signal input terminals A1, A2 and A3, respectively, corresponding to the above mentioned external video signal input terminals $V_1$, $V_2$ and $V_3$. The audio signal selected by the switching circuit 29 is supplied through a low frequency amplifier 30 to a loudspeaker 31.

The horizontal and vertical synchronizing signals from the main video/chroma signal circuit 8M are supplied to a deflection/high voltage circuit 27. The deflection signal and the high DC voltage from the circuit 27 are supplied to the cathode ray tube 18.

The video signal from the sub-tuner 5S is supplied to the sub-video intermediate frequency circuit 6S. The video intermediate frequency signal therefrom is supplied to the sub-switching circuit 7S which selectively switches between this video signal and the external video signals from the external video signal input terminals $V_1$ to $V_3$. A switch 25 selects between the video signal selected by the switching circuit 7S and the video signal from the main switching circuit 7M and supplies the chosen video signal to the sub-video/chroma signal circuit 8S. From this sub-video/chroma signal circuit 8S, there are derived red, green and blue color signals R, G and B. These red, green and blue color signals R, G and B are supplied to a matrix circuit 10 in which they are converted to a luminance signal Y and red and blue color difference signals R-Y and B-Y, respectively, which are then fed to an A/D (analog-to-digital) converter 13 in the video signal processor circuit 12.

The A/D converter 13 is a time division type A/D converter as disclosed, for example, in Japanese published patent application No. 60-47792. The digital signal from the A/D converter 13 is supplied to a memory 14 and then written therein. The digital signal read out from the memory 14 is supplied to a D/A (digital-to-analog) converter 15 and is thereby converted to an analog signal. In the video signal processor circuit 12, sampling lines and picture elements of the video signal are selected and other lines and picture elements are thrown away or removed in correspondence with the ratio between the sizes of the main picture screen and the sub-picture screen. The memory 14 has frame (or field) memory area corresponding to the maximum number of displayable sub-pictures, for example, four frame memory areas. This memory 14 is controlled by a sub-picture controller 16 so as to specify the kinds of sub-pictures, such as a live picture, a still picture, a step-by-step picture and so on, the number of sub-pictures, the position of the sub-picture on the main picture and the like.

When the sub-picture is displayed as a live, i.e. a real moving picture, the video signal is alternately written in and read out from the memory 14 continuously and repeatedly; when the sub-picture is displayed as a still picture, the video signal is written in the memory 14 for a selected frame or field period and then read out from the memory 14 repeatedly; and when the sub-picture is displayed as a step-by-step picture, a plurality of video signals are written in the memory 14 at different times corresponding to different frames or field periods and then read out therefrom repeatedly (see Japanese laid-open patent application No. 56-27573). The number of the sub-picture screens inset into the main picture screen is determined on the basis of the number of memory areas in the memory 14 which are used. The contents or pictures of the sub-picture screen can be a real moving picture, a still picture or a step-by-step picture based on the video signal from the sub-video/chroma signal circuit 8S or on the video signal from the main video/chroma signal circuit 8M. The switching of these video signals is carried out by the above mentioned switch 25. The picture contents on the main picture screen and the sub-picture screen can be exchanged with each other by simultaneously switching the reception channels of the main and sub-tuners 5M and 5S or by simultaneously switching the main and sub-switching circuits 7M and 7S.

The respective color signals from the main/video chroma signal circuit 8M and the respective color signals from the D/A converter 15 are supplied to the switching circuit 9 in which both groups of respective color signals are switched at appropriate timing intervals such that the sub-picture screen is inset into one portion of the main picture screen at a selected, predetermined position. This switching circuit 9 is controlled by the sub-picture controller 16, which is controlled by the system controller 20. The video signal from the switching circuit 9 is supplied to the cathode ray tube 18.

The main picture discrimination indicating signal, such as a signal indicative of the main channel number, is formed by the main character display circuit 19M and is added to the video signal by an adder 17 connected between the switching circuit 9 and the cathode ray tube 18. In this example, the adder 17 is interposed only in the transmission path of the green color signal G to thereby superimpose a green picture discrimination indication upon the main picture screen. It is of course possible that this picture discrimination indication can be made by using other colors.

The sub-picture discrimination indicating signal, formed by the sub-character display circuit 19S and which could be indicative of the channel number selected by the sub-tuner 5S, for example, is added to the sub-video signal by an adder 11 connected between the matrix circuit 10 and the A/D converter 13. In this example, an adder 11 is interposed only in the transmission path of the luminance signal Y to thereby superimpose a white picture discrimination indication on the sub-picture screen. Also, it is possible that this picture discrimination indication can be made by using other colors.

The channel selections in the above mentioned main tuner 5M and sub-tuner 5S are carried out by channel selection signals from the system controller 20. The switching circuits 3, 7M, 7S, 29 and the switch 25 are also selectively switched under the control of the system controller 20. The main and sub-video/chroma signal circuits 8M and 8S are subjected to blanking by the system controller 20 for a short period upon the up and down scanning channel selection operation. Alternatively, this blanking may be carried out by a blanking switch that is provided at the pre-stage of the cathode ray tube 18. Further, main and sub-horizontal synchronizing signals Hm and Hs from the main and sub-video intermediate frequency circuits 6M and 6S and main and sub-vertical blanking signals (vertical signals) Vm and Vs from the main and sub-video/chroma signal circuits 8M and 8S are supplied to the system controller 20. The main picture and sub-picture discrimination indicating signal circuits 19M and 19S and the sub-picture controller 16 are controlled by the system controller 20.

A last-condition memory 21 is provided which stores, under the control of the system controller 20, the selected channels of the main and sub-tuners 5M and 5S, the switch conditions of the switching circuits 7M and 7S, the control conditions of the sub-picture controller 16 and so on when the power of the television receiver is turned off. When the television receiver is powered on again, the conditions of the respective circuits presented when the power of the television receiver was last turned off are displayed under the control of the system controller 20.

A key apparatus 22 is connected to the system controller 20 and is provided with various kinds of keys KY to control the television receiver.

Reference numeral 24 denotes a remote controller (commander) which is also provided with various kinds of keys KY to control the television receiver. This remote controller 24 is also provided with a transmitter (not shown) to transmit a remote control signal based on the corresponding key operation. A receiver 23 for receiving the signal transmitted from the transmitter of the remote controller 24 is connected to the system controller 20. The remote control signal can be transmitted by means of a light beam, radio wave, sound wave and so on.

The way of example, the keys KY of the key apparatus 22 or the remote controller 24 will be enumerated as follows: a power key 33; a recall key 34 (used to display the picture discrimination indication such as the channel number); a mute key (used to mute the sound); ten keys (designated generally by the reference numeral 35) used to select the reception channel and the number of the external video signal input terminal; a TV (television)/VTR change-over key; an antenna input/auxiliary high frequeny input change-over key; a sound multiplexing key; up and down keys 36 for incrementing and decrementing the contrast of luminance and chrominance signals, the main reception channels, and the number of the main external vieo signal input terminal, and the sound volume respectively; an on-off key 37 for the sub-picture screen; up and down keys 38 for incrementing and decrementing the sub-reception channel and the number of the sub-external video signal input terminal; a still picture key 40; a step-by-step picture key 43; a shift key 42 used to shift the position of the sub-picture screen; and a main-sub-exchange key 39 used to exchange the picture contents on the main picture and sub-picture screens.

Figure 1:
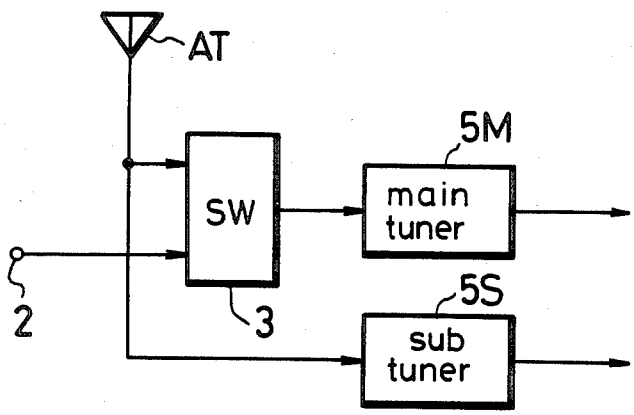
FIG. 1 is a circuit diagram showing a main portion of one example of a prior art television receiver.
Figure 3:
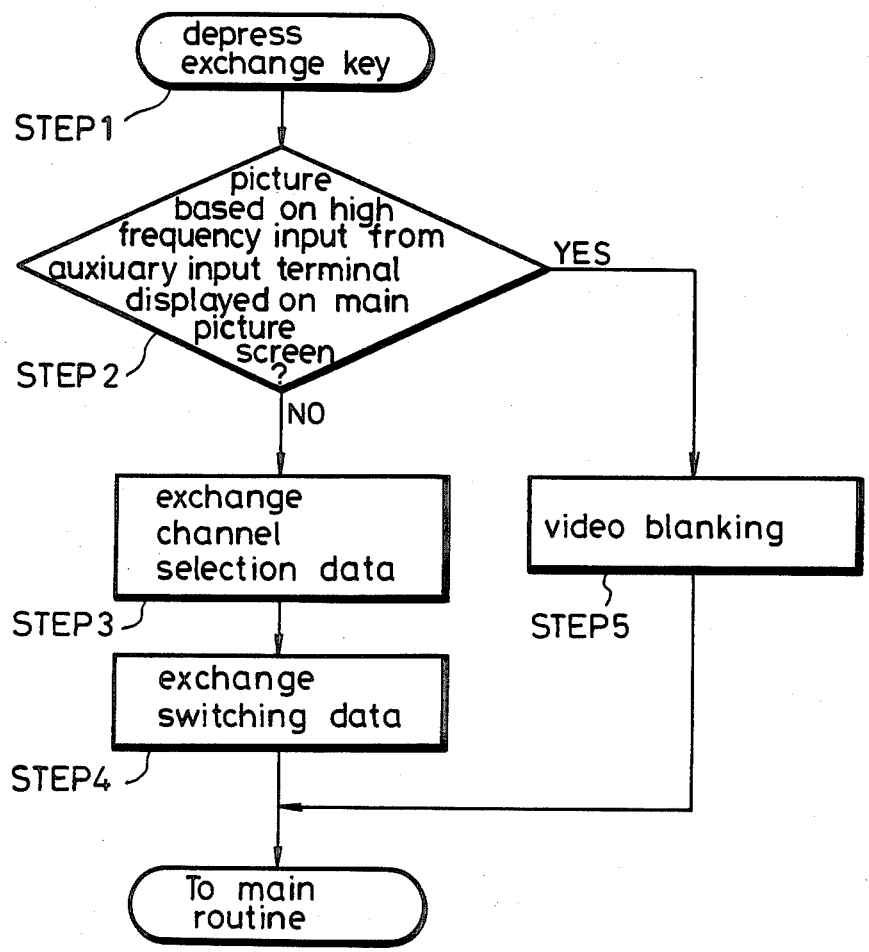
FIG. 3 is a flow chart to which reference will be made in explaining the operation of the television receiver shown in FIG. 2.

According to this embodiment, when the exchange key 39 on the remote controller 24 for exchanging the contents of the main picutre Sm and sub-picture Ss is depressed, the television receiver is operated in accordance with a flow chart of FIG. 3 under the control of the system control circuit 20.

Referring to the flow chart of FIG. 3, when the main-sub-exchange key 39 is depressed at step 1, it is determined by the system control circuit 20 at step 2 whether or not the picture based on the high frequency input from the auxiliary input terminal 2 is displayed on the main picture screen Sm.

When a picture based on the high frequency input from the auxiliary input terminal 2 is not displayed on the main picture screen Sm, or when the picture which is displayed on the main picture screen Sm is based on the antenna input from the antenna At or the video signal from one of the external video signal input terminals $V_1$ to $V_3$, the channel selection data, that is PLL (phase locked loop) data of the main and sub-tuners 5M and 5S are exchanged at step 3. In that case, the picture discrimination indication data are also exchanged between the main picture screen Sm and the sub-picture screen Ss simultaneously. At step 4, after the channel selection data are exchanged, the switching data of the main and sub-switching circuits 7M and 7S are exchanged. When the respective data as described above are exchanged, the data stored in the last condition memory 21 are rewritten under the control of the system control circuit 20.

Figure 4A:
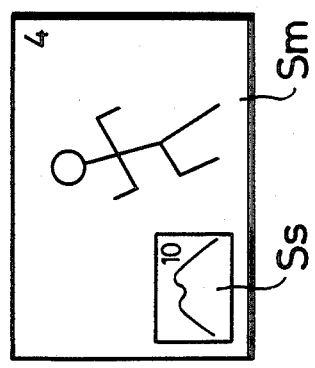
FIGS. 4A and 4B and FIGS. 5A to 5C are illustrations of the pictures on the display screen to be used for explaining the operation of the television receiver shown in FIG. 2.
Figure 4B:
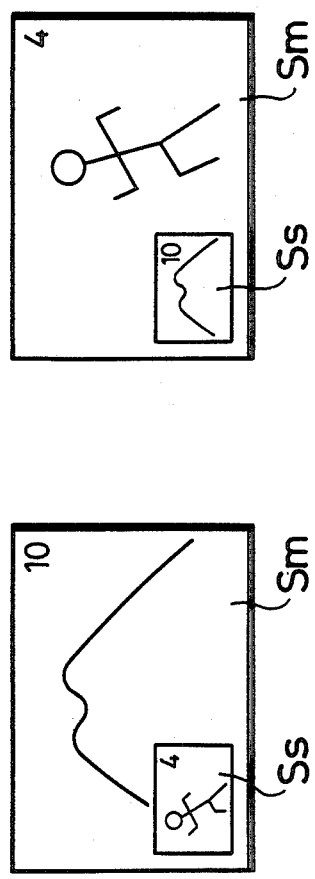

Accordingly, in this case, when the pictures shown in FIG. 4A are displayed respectively on the main and sub-picture screens Sm and Ss before the main-sub-exchange key 39 is depressed, if the exchange key 39 is then depressed, the pictures displayed on the main and sub-picture screen Sm and Ss are exchanged as shown in FIG. 4B.

Figure 5A:
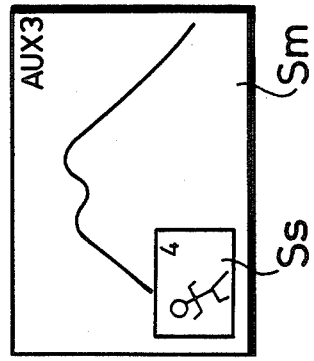

On the other hand, when a picture based on the high frequency input signal from the auxilliary input terminal 2 is displayed on the main picture screen Sm, as illustrated in FIG. 5A, the pictures displayed on the main picture screen Sm and the sub-picture screen Ss can not be exchanged, as the channel selection data of the main tuner 5M and the sub-tuner 5S are inhibited by the system controller 20 from being exchanged. This is because the sub-tuner 5S is not supplied with the high frequency input signal from the auxiliary input terminal 2. For this reason, at step 5 (FIG. 3), the channel selection data of the main and sub-tuners 5M and 5S are not exchanged by the system controller 20 but instead the video blanking is effected in, for example, the main and sub-video/chroma signal circuits 8M and 8S during a predetermined time period, for example, 0.3 seconds, thereby warning the user that an exchange of the channel selection data can be done. Alternatively, the blanking of the video signal can be carried out by a blanking-switch circuit provided in a pre-stage of the cathode ray tube 18.

Figure 5B:
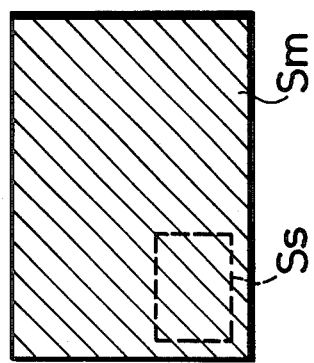
Figure 5C:
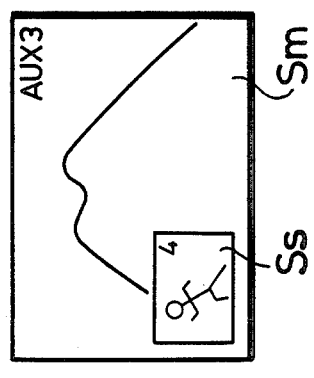

Accordingly, in this case, when the pictures shown in FIG. 5A are displayed respectively on the main picture screen Sm and the sub-picture screen Ss before the exchange key 39 is depressed, if the main-sub-exchange key 39 is then depressed, the video blanking is effected for 0.3 seconds as shown in FIG. 5B. Thereafter, the original pictures are displayed respectively on the main picture screen Sm and the sub-picture screen Ss as shown in FIG. 5C.

According to this embodiment, when a picture based on the high frequency input signal from the auxiliary input terminal 2 is displayed on the main picture screen Sm and the pictures displayed on the main picture screen Sm and the sub-picture screen Ss can not be exchanged by exchanging the channel selection data of the main and sub-tuners 5M and 5S, even if the exchange key 39 for exchanging the pictures is depressed, the pictures are inhibited from being exchanged with each other and also video blanking is carried out during a predetermined time period, thus warning the user that no exhange is taking place. Accordingly, operation of the television receiver is made easier for the viewer and the user is relieved of anxiety when the pictures can not be exchanged.

While in the above mentioned embodiment the user is warned by effecting video blanking, in another embodiment it is also possible that the main character display circuit 19M, for example, can be controlled so as to display specific characters on the main picture screen Sm to thereby warn the user.

The above description is given on a single preferred embodiment of the present invention but it will be apparent that many modifications and variations could be effected by one skilled in the art without departing from the spirits or scope of the novel concepts of the invention so that the scope of the invention should be determined by the appended claims only.

I claim as my invention:

1. A television receiver in which a sub-picture screen is provided within a main picture screen so that different pictures can be displayed on said main picture screen and the sub-picture screen, comprising:
    (a) main tuner means, including a switching circuit, to which either a first high frequency input or a second high frequency input are selectively supplied through the switching circuit to thereby form a main picture video signal for said main picture screen, the main tuner means including a user operable main channel selector for selecting a channel from a plurality of channels embodied in the first high frequency input;
    (b) sub-tuner means to which said first high frequency input is supplied to thereby form a sub-picture video signal for said sub-picture screen, the sub-tuner means including a user operable sub-channel selector for selecting a channel from a plurality of channels embodied in the first high frequency input;
    (c) means for generating a command signal for exchanging pictures displayed on said main and sub-picture screens; and
    (d) exchange means supplied with the command signal for exchanging the channel selection data of said main tuner and said sub-tuner with each other when said command signal is generated provided that said first high frequency input is then being supplied to said main tuner, but for inhibiting the exchange of the channel selection data of said main tuner and said sub-tuner and for generating a warning during a predetermined time period in order for a user to understood that the exchange is impossible if said second high frequency input is being supplied to said main tuner when the command signal is generated.

2. A television receiver as claimed in claim 1, wherein said second high frequency input is a descrambled high frequency signal from a subscription television network.

3. A television receiver as claimed in claim 1, wherein said warning is a video blanking.

4. A television receiver as claimed in claim 1, wherein said warning is a display made on said main picture screen.

5. A television receiver as claimed in claim 4, wherein said display on said main picture screen is a specific character display.

6. A television receiver as claimed in claim 1, wherein said predetermined time period is several hundred milliseconds.

* * * * *